United States Patent
Kujawa et al.

(10) Patent No.: US 12,485,585 B2
(45) Date of Patent: Dec. 2, 2025

(54) METHODS OF FORMING BLOCKS UTILIZABLE FOR BUILDING CONSTRUCTION OUT OF NON-RECYCLABLE PLASTIC WASTE RAW MATERIAL

(71) Applicants: Heidi Kujawa, Sherman Oaks, CA (US); Michael Kujawa, Ingleburn (AU)

(72) Inventors: Heidi Kujawa, Sherman Oaks, CA (US); Michael Kujawa, Ingleburn (AU)

( * ) Notice: Subject to any disclaimer, the term of this patent is extended or adjusted under 35 U.S.C. 154(b) by 150 days.

(21) Appl. No.: 18/533,180

(22) Filed: Dec. 8, 2023

(65) Prior Publication Data
US 2024/0100741 A1    Mar. 28, 2024

Related U.S. Application Data

(63) Continuation-in-part of application No. 17/131,019, filed on Dec. 22, 2020, now abandoned.

(51) Int. Cl.
*B29B 17/00* (2006.01)
*B29B 17/04* (2006.01)

(52) U.S. Cl.
CPC ...... *B29B 17/0036* (2013.01); *B29B 17/0412* (2013.01); *B29B 2017/0015* (2013.01)

(58) Field of Classification Search
None
See application file for complete search history.

(56) References Cited

U.S. PATENT DOCUMENTS 5,106,594 A    4/1992    Held et al.
5,150,307 A    9/1992    McCourt et al.
(Continued)

FOREIGN PATENT DOCUMENTS

CN    101104297 A    1/2008
CN    104446179 A    3/2015
(Continued)

OTHER PUBLICATIONS

"Utilization of Waste Plastic in Manufacturing of Bricks", Published at IJRASET, by Yash Kadhone et al., Published Online on [May 7, 2022] https://www.ijraset.com/best-journal/utilization-of-waste-plastic-in-manufacturing-of-bricks.
(Continued)

*Primary Examiner* — Xiao S Zhao
*Assistant Examiner* — Inja Song
(74) *Attorney, Agent, or Firm* — LegalForce RAPC Worldwide

(57) ABSTRACT

A method of forming blocks having dimensional uniformity thereacross associated with building construction includes shredding, via a shredder, a non-recyclable plastic waste raw material having a specific dimensional length and a height into a number of strips having a uniform dimensional width of 0.120 inches to 1 inch, and weighing the number of strips at a weigh apparatus. The method also includes isolating and batching the number of strips collected and weighed, and compressing the isolated and batched number of strips in a compression chamber to form a block based on steam-sanitizing the isolated and batched number of strips in the compression chamber with steam having a temperature varying from 220° F. to 850° F. and a pressure of 30-500 Pounds per Square Inch (PSI) and introduced intermittently across regions of the compression chamber to solely activate a base polymer of each of the isolated and batched number of strips.

20 Claims, 13 Drawing Sheets

(56) References Cited

U.S. PATENT DOCUMENTS

| | | | |
|---|---|---|---|
| 5,411,697 A * | 5/1995 | McGraw | B30B 9/3007 |
| | | | 428/903.3 |
| 5,472,498 A | 12/1995 | Stephenson et al. | |
| 6,274,637 B1 | 8/2001 | Schallenberg | |
| 6,889,479 B2 | 5/2005 | Thorpe | |
| 7,971,407 B2 | 7/2011 | MacDonald | |
| 8,202,918 B2 | 6/2012 | Azulay et al. | |
| 8,545,748 B2 | 10/2013 | Alsewailem | |
| 8,578,669 B2 | 11/2013 | Zohar | |
| 8,846,776 B2 | 9/2014 | Herrington et al. | |
| 8,906,156 B2 | 12/2014 | Constantz et al. | |
| 9,079,347 B2 | 7/2015 | Chow | |
| 9,670,095 B2 | 6/2017 | Al-Aqeeli et al. | |
| 9,840,851 B2 | 12/2017 | Propst | |
| 10,113,305 B2 | 10/2018 | Radford | |
| 10,865,143 B2 | 12/2020 | Ali et al. | |
| 11,267,948 B2 | 3/2022 | Phan | |
| 11,498,870 B2 | 11/2022 | Barrow et al. | |
| 11,597,120 B2 | 3/2023 | Martinez | |
| 2002/0096796 A1 | 7/2002 | De La Concha Estrada | |
| 2003/0015461 A1 | 1/2003 | Miyamoto et al. | |
| 2003/0157297 A1 * | 8/2003 | Lewis | B29B 17/0026 |
| | | | 264/237 |
| 2005/0182160 A1 | 8/2005 | Milani Nejad et al. | |
| 2006/0174782 A1 * | 8/2006 | Walker | B29C 43/003 |
| | | | 100/305 |
| 2007/0193224 A1 | 8/2007 | Hasselbach et al. | |
| 2007/0266904 A1 | 11/2007 | Marti | |
| 2008/0184649 A1 | 8/2008 | Khan | |
| 2009/0218717 A1 | 9/2009 | Albrecht et al. | |
| 2010/0230521 A1 | 9/2010 | Butler et al. | |
| 2016/0053078 A1 | 2/2016 | Dubey et al. | |
| 2019/0127975 A1 | 5/2019 | Spreen | |
| 2021/0179852 A1 | 6/2021 | Nystrom | |
| 2021/0229143 A1 * | 7/2021 | Varis | B31B 50/59 |
| 2023/0183438 A1 * | 6/2023 | King | C08J 7/0427 |
| | | | 428/182 |

FOREIGN PATENT DOCUMENTS

| | | | | |
|---|---|---|---|---|
| CN | 113698146 A | 11/2021 | | |
| EP | 1199417 A2 | 4/2002 | | |
| GB | 2514706 A | 12/2014 | | |
| KR | 100293771 B1 | 9/2001 | | |
| WO | 1995034418 A1 | 12/1995 | | |
| WO | WO-03037597 A1 * | 5/2003 | | B29C 43/52 |
| WO | 2011135388 A2 | 11/2011 | | |
| WO | 2013190565 A2 | 12/2013 | | |
| WO | 2015044916 A1 | 4/2015 | | |
| WO | 2017093821 A1 | 6/2017 | | |
| WO | 2018178419 A1 | 10/2018 | | |
| WO | 2019049171 A1 | 3/2019 | | |
| WO | 2019211654 A1 | 11/2019 | | |
| WO | WO-2023165804 A1 * | 9/2023 | | C08L 9/06 |
| WO | 2024013558 A1 | 1/2024 | | |

OTHER PUBLICATIONS

"Development of Eco-Friendly Bricks for Sustainable Construction", Published at International Conference on Materials Science and Engineering (ICMSE 2022), by Dr. Vishal Puri et al., Published Online in [Jul. 2022] https://iopscience.iop.org/article/10.1088/1757-899X/1248/1/012109/pdf.

"Utilisation of plastic waste as aggregate in construction materials: A review", Published at Construction and Building Materials, by Nur Hanis Zulkernain et al., Published Online on [Aug. 16, 2021] https://philarchive.org/archive/NGUOPX.

"Recycling Waste Plastic Bags as a Replacement for Cement in Production of Building Bricks and Concrete Blocks", Published at Journal of Waste Resources and Recycling, by Abdel Tawab OF et al., Published Online on [Dec. 23, 2020] https://rb.gy/cd5s8q.

"Utilization of Waste Plastic for Manufacturing of Bricks Along With Quarry Dust and M-Sand", Published at International Journal of Mechanical Engineering, by Mudigonda Harish Kumar et al., Published Online on [Feb. 2, 2022] https://kalaharijournals.com/resources/FebV7_12_403.pdf.

"Utilization of Plastic Waste in Manufacturing of Bricks", Published at IJARET, by Mohd Aamir Gour et al., Published Online in [May 2020] https://rb.gy/jkcx40.

"Techno-Assessment of the Use of Recycled Plastic Waste in RE", Published at Trends in Waste Utilization in Construction, by Wahidul K. Biswas et al., Published Online on [Aug. 4, 2021] https://www.mdpi.com/2071-1050/13/16/8678.

"Utilization of Plastic Waste for Developing Composite Bricks and Enhancing Mechanical Properties: A Review on Challenges and Opportunities", Published at Advances in Polymer Technology, by Aditya Singh et al., Published Online in [May 2, 2023] https://www.hindawi.com/journals/apt/2023/6867755/.

"A Review on Plastic Waste as Sustainable Resource in Civil Engineering Applications", Published at IOP Conference Series: Materials Science and Engineering, by T O Ogundairo et al., Published Online in [Mar. 2021] https://iopscience.iop.org/article/10.1088/1757-899X/1036/1/012019/pdf.

"Recycling/Reuse of Plastic Waste as Construction Material For Sustainable Development: A Review", Published at Environmental Science and Pollution Research, by Pooja Lamba et al., Published Online on [Oct. 16, 2021] https://link.springer.com/article/10.1007/s11356-021-16980-y.

"Utilization of Plastic Waste in Manufacturing of Plastic Sand Bricks", Published at JETIR, by Arvind Singhal et al., Published Online in [Jun. 2018] https://www.jetir.org/papers/JETIRC006052.pdf.

"Recycling Waste Thermoplastic for Making Lightweight Bricks", Published at Engineering, Environmental Science, Materials Science, by M. K. Mondal et al., Published Online in [2017] http://uest.ntua.gr/athens2017/proceedings/pdfs/Athens2017_Mondal_Bose_Bansal.pdf.

"Cementitious Materials Incorporating Waste Plastics: A Review", Published at SN Applied Sciences, by Rawa Ahmed Mahmood et al., Published Online on [Nov. 24, 2020] https://link.springer.com/article/10.1007/s42452-020-03905-6.

"Potential Applications of Different Forms of Recycled Plastics as Construction Materials—A Review †", Published at The 1st International Online Conference on Buildings, by Shehryar Ahmed et al., Published Online on [Oct. 24, 2023] https://www.mdpi.com/2673-4591/53/1/5.

* cited by examiner

METHODS OF FORMING BLOCKS UTILIZABLE FOR BUILDING CONSTRUCTION OUT OF NON-RECYCLABLE PLASTIC WASTE RAW MATERIAL

CLAIM OF PRIORITY

This Application is a Continuation-in-Part Application of, and claims priority to, co-pending U.S. patent application Ser. No. 17/131,019 titled APPARATUS FOR FORMING AN ARTICLE filed on Dec. 22, 2020, which was also filed as a PCT application titled APPARATUS FOR FORMING AN ARTICLE on Aug. 8, 2021. The contents of each of the aforementioned applications are incorporated in entirety thereof in this Application by reference.

FIELD OF TECHNOLOGY

The embodiments generally relate to non-recyclable waste material and methods for forming blocks utilizable for building construction out of non-recyclable plastic waste raw material.

BACKGROUND

Large volumes of waste inundate both the developed and undeveloped communities throughout the world. In the developed world, many governments have organized waste mitigation solutions to collect, process, and manage large volumes of waste produced by members of the community. In particular, efforts to recycle plastics and paper waste have focused on processes wherein recyclable materials are sorted into various types, and controlled proportions are utilized to produce recycled products.

Developing nations and communities thereof may have no organized means for collecting recyclable materials and transforming the recyclable materials into a usable item. Lack of waste management infrastructure and, specifically, material collection and sorting capabilities may compound the proliferation of plastic waste in the environment overall.

In the current arts, there are seven types of plastic including: Code 1: Polyethylene Terephthalate (PET or PETE); Code 2: High Density Polyethylene (HDPE); Code 3: Vinyl (Polyvinyl Chloride or PVC); Code 4: Low Density Polyethylene (LDPE); Code 5: Polypropylene (PP); Code 6: Polystyrene (PS); and Code 7: Other.

Of these seven types of plastics, generally only Code 1: Polyethylene Terephthalate (PET or PETE) and Code 2: High Density Polyethylene (HDPE) are sorted and recycled and the remaining types, referred to in the arts as mixed plastics, are landfilled or incinerated. This sorting system is generally accepted in the industry. However, tightly controlled sorting may be expensive and a significant cost component in current recycling processes.

SUMMARY OF THE INVENTION

Disclosed are methods of forming blocks utilizable for building construction out of non-recyclable plastic waste raw material.

In one aspect, a method of forming blocks having dimensional uniformity thereacross associated with building construction is disclosed. The method includes shredding, via a shredder, a non-recyclable plastic waste raw material having a dimensional length of 1 inch to 20 feet and a dimensional height of 0.0393 inches to 2 inches into a number of strips having a uniform dimensional width of 0.120 inches to 1 inch, and weighing the number of strips at a weigh apparatus in accordance with triggering agitation of a conveyor belt associated with the weigh apparatus on which the number of strips is weighed upon weighing of ~50% of a desired weight of a block of the blocks to be formed in terms of the number of strips, shredding the non-recyclable plastic waste raw material only until the number of strips collected and weighed is equal in weight to the desired weight of the block, and isolating and batching the number of strips collected and weighed.

The method also includes compressing the isolated and batched number of strips in a compression chamber to form the block based on steam-sanitizing the isolated and batched number of strips in the compression chamber with steam having a temperature varying from 220° F. to 850° F. and a pressure of 30-500 Pounds per Square Inch (PSI) and introduced intermittently across regions of the compression chamber, and solely activating a base polymer of each of the isolated and batched number of strips in accordance with the temperature of the intermittently introduced steam directly affecting the isolated and batched number of strips while leaving other constituent elements thereof chemically unaffected and the base polymer also unaffected in terms of a phase change thereof.

The block is formed based on, in accordance with the varying temperature of the steam, adherence of the base polymer of the each of the isolated and batched number of strips to the base polymer of another strip of the isolated and batched number of strips and compression thereof due to the intermittently introduced steam.

In another aspect, a method of forming blocks having dimensional uniformity thereacross associated with building construction is disclosed. The method includes feeding, into a shredder, plastic waste material bearing recycling Code 3-Code 7 and/or plastic waste (e.g., rejected) material bearing recycling Code 1-Code 2 having a dimensional length of 1 inch to 20 feet and a dimensional height of 0.0393 inches to 2 inches, and shredding, via the shredder, the plastic waste material bearing recycling Code 3-Code 7 and/or the plastic waste material bearing recycling Code 1-Code 2 into a number of strips having a uniform dimensional width of 0.120 inches to 1 inch. The method also includes weighing the number of strips at a weigh apparatus in accordance with triggering agitation of a conveyor belt associated with the weigh apparatus on which the number of strips is weighed upon weighing of ~50% of a desired weight of a block of the blocks to be formed in terms of the number of strips, shredding the plastic waste material bearing recycling Code 3-Code 7 and/or the plastic waste material bearing recycling Code 1-Code 2 only until the number of strips collected and weighed is equal in weight to the desired weight of the block, and isolating and batching the number of strips collected and weighed.

Further, the method includes compressing the isolated and batched number of strips in a compression chamber to form the block based on steam-sanitizing the isolated and batched number of strips in the compression chamber with steam having a temperature varying from 220° F. to 850° F. and a pressure of 30-500 PSI and introduced intermittently across regions of the compression chamber, and solely activating a base polymer of each of the isolated and batched number of strips in accordance with the temperature of the intermittently introduced steam directly affecting the isolated and batched number of strips while leaving other constituent elements thereof chemically unaffected and the base polymer also unaffected in terms of a phase change thereof.

The block is formed based on, in accordance with the varying temperature of the steam, adherence of the base polymer of the each of the isolated and batched number of strips to the base polymer of another strip of the isolated and batched number of strips and compression thereof due to the intermittently introduced steam.

In yet another aspect, a method of forming blocks having dimensional uniformity thereacross associated with building construction is disclosed. The method includes shredding, via a shredder, a non-recyclable plastic waste raw material having a dimensional length of 1 inch to 20 feet and a dimensional height of 0.0393 inches to 2 inches into a number of strips having a uniform dimensional width of 0.120 inches to 1 inch, and weighing the number of strips at a weigh apparatus in accordance with triggering agitation of a conveyor belt associated with the weigh apparatus on which the number of strips is weighed upon weighing of ~50% of a desired weight of 10-500 lbs of a block of the blocks to be formed in terms of the number of strips, shredding the non-recyclable plastic waste raw material only until the number of strips collected and weighed is equal in weight to the desired weight of 10-500 lbs of the block, and isolating and batching the number of strips collected and weighed.

The method also includes delivering an exact aggregate density of the isolated and batched number of strips to the compression chamber, and compressing the isolated and batched number of strips in the compression chamber to form the block based on steam-sanitizing the isolated and batched number of strips in the compression chamber with steam having a temperature varying from 220° F. to 850° F. and a pressure of 30-500 PSI and introduced intermittently across regions of the compression chamber, and solely activating a base polymer of each of the isolated and batched number of strips in accordance with the temperature of the intermittently introduced steam directly affecting the isolated and batched number of strips while leaving other constituent elements thereof chemically unaffected and the base polymer also unaffected in terms of a phase change thereof.

The block is formed based on, in accordance with the varying temperature of the steam, adherence of the base polymer of the each of the isolated and batched number of strips to the base polymer of another strip of the isolated and batched number of strips and compression thereof due to the intermittently introduced steam.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to form blocks utilizable for building construction out of non-recyclable plastic waste raw material. Although the present embodiments have been described with reference to specific example embodiments, it will be evident that various modifications and changes may be made to these embodiments without departing from the broader spirit and scope of the various embodiments.

Figure 1:
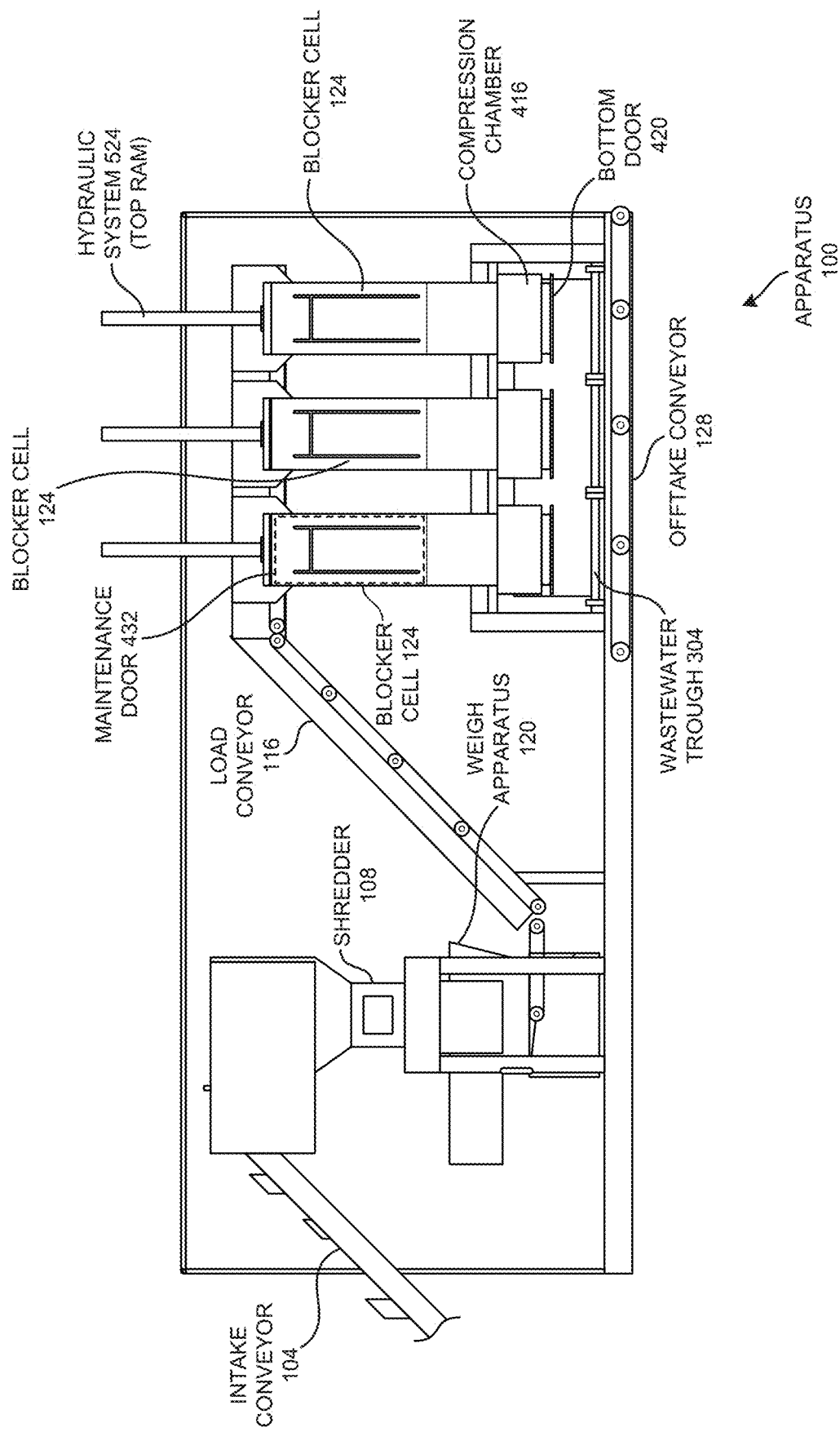
FIG. 1 is an illustrative side elevation view of a three blocker cell apparatus, according to one or more embodiments.

FIG. 1 illustrates an exemplary three blocker cell apparatus 100 for forming an article; apparatus 100 may be a mobile community blocker apparatus. Apparatus 100 may be designed to be used either in a standalone configuration whereby a full scale operation may be established through leveraging apparatus 100 entirely or in a configuration in which apparatus 100 may be installed inline of an existing sorting line/material recycling facility or an analogous waste management operation.

A decontamination station may be utilized by operators for the removal of residual contaminants before entering an intake conveyor 104 or a load conveyor 116. In a standalone operation, intake conveyor 104 loads plastic from a conventional bale breaker or bale preparation station into a shredder 108 configured to shred plastics into suitably sized strips of about 0.120 inches to 1 inch in width and 1 inch to 20 feet long. In an inline installation, non-plastic materials and other constituent elements may solely be removed from the plastic before entering intake conveyor 104. A weigh apparatus 120 weighs the shredded plastic strips to a programmed mass density between 10-500 lbs; the shredded plastic strips may be mixed and agitated at weigh apparatus 120 before delivery thereof, via load conveyor 116, to a blocker cell 124. Blocker cell 124 processes the shredded plastic into blocks, which may be utilized for various purposes. An offtake conveyor 128 transfers the blocks from blocker cell 124 out of apparatus 100.

In some embodiments, shredder 108 operates to handle variable processing speeds to address variations in plastic volume requirements. Shredder 108 may be in operable communication with a controller to allow an operator to vary the speed of shredder 108 and ensure a steady flow of plastic into and out of shredder 108. In some embodiments, load conveyor 116 is configured in an inclined position and uses a cleated belt to facilitate the movement of the material to the designated blocker cell 124. FIG. 1 shows three blocker cells 124 as part of apparatus 100.

Figure 2:
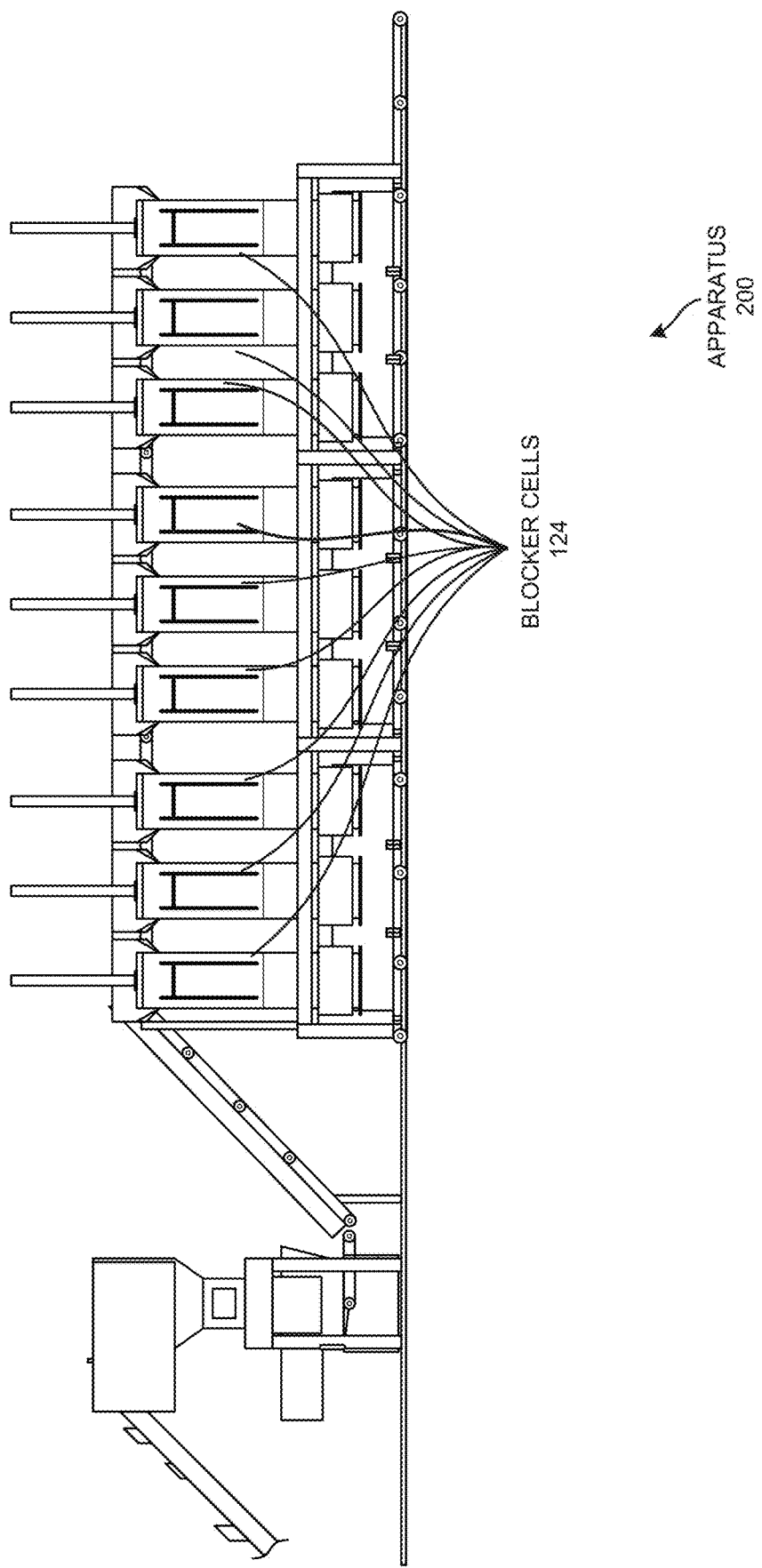
FIG. 2 is an illustrative side elevation view of a nine blocker cell apparatus larger in scale compared to the three blocker cell apparatus of FIG. 1, according to one or more embodiments.
Figure 3:
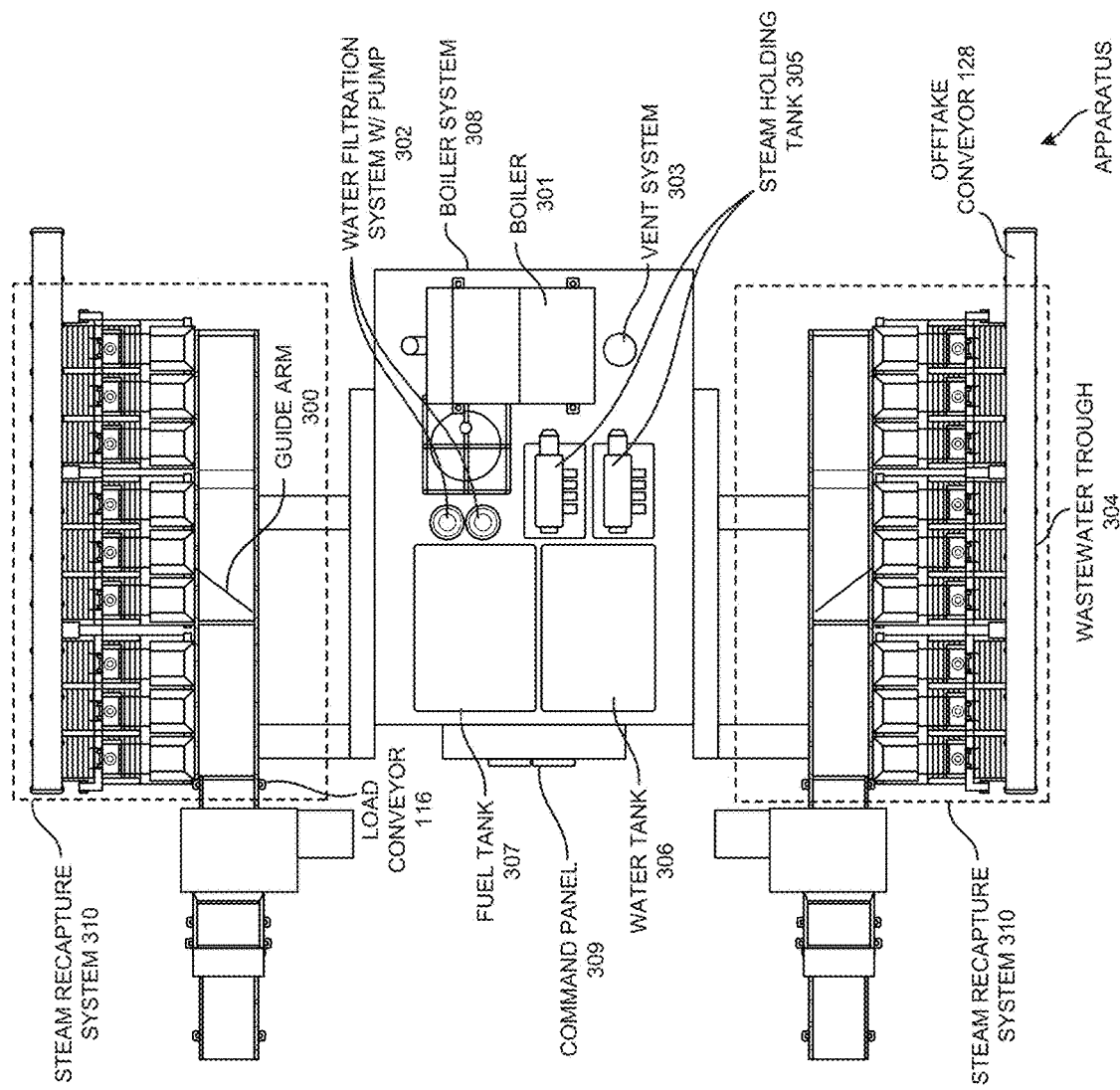
FIG. 3 is an illustrative top plan view of the apparatus larger in scale compared to the nine blocker cell apparatus of FIG. 2 and internal components, according to one or more embodiments.

FIG. 2 illustrates a larger scale nine blocker cell apparatus 200 (e.g., an industrial blocker apparatus) that is configured to output a high volume of plastic compared to apparatus 100 of FIG. 1. Apparatus 200 operates using similar processes having components configured to process a larger amount of plastic. Apparatus 200 may include more blocker cells 124 to simultaneously process a higher volume of plastic strips. Apparatus 100 of FIG. 1, for example, includes three blocker cells 124 while apparatus 200 of FIG. 2 includes nine (or more) blocker cells 124 as shown for example purposes therein. One skilled in the arts will readily understand that the number of blocker cells 124 may be changed in view of the specific application, location of apparatus 100/200 and/or volume of non-recyclable plastic waste that is required to be processed FIG. 3 illustrates a top plan view of apparatus 200 doubled in size to illustrate the internal components of the system and the modularity of the system components, such as the boiler system 308. Load conveyor 116 includes a guide arm 300 that may pivot to direct the flow of plastic to blocker cell 124. Guide arm 300 may be in communication with a controller to operate a pivot to allow an operator to selectively pivot guide arm 300 to a suitable position during use. A wastewater trough 304 may be developed to capture wastewater and to provide first level filtration. Wastewater trough 304 may be positioned under each blocker cell 124 and offtake conveyor 128. This allows for wastewater to be captured via a pump or gravity depending on the configuration or location of apparatus 100/200. In some embodiments, the system permits wastewater recapture. In such, the wastewater is captured and filtered for reuse. Wastewater trough 304 may account for seamless integration into commercially available add-on filtration systems to conform to regulations (e.g., local regulations) around water safety.

A boiler system 308 generates high-pressure steam to form the blocks produced by apparatus 100/200. Boiler system 308 includes a boiler 301, water filtration system with pump 302, a vent system 303, steam holding tanks 305, a water tank 306 and a fuel tank 307 all controlled by a centralized, integratable, configurable command panel 309 to generate the high-pressure steam. The system may be configurable based on the energy resources available at the location of the system. For example, the system may operate using propane, natural gas, alternative energy or electric power. In some embodiments, apparatus 200 may be configured with a steam recapture system 310 that is designed to recapture steam and collect the condensate for future use.

FIG. 3 also shows a wastewater trough 304 configured to resist corrosion under constant moisture in some embodiments. At least one drainage point is provided per blocker cell to drain wastewater from wastewater trough 304. The number of drainage points is dependent on the number of blocker cells 124 from which wastewater trough 304 gathers wastewater.

In some embodiments, the steam supply lines feed the needles and the compression chamber (e.g., compression chamber 416). Return steam supply lines may be provided to collect and return reclaimed water to a retention tank for reuse in future cycles. In some embodiments, the steam supply to the needles do not include return steam supply lines. Each steam supply line includes separate valves (e.g., two to twenty) to perform directional flow, on/off and/or flow controls, each with individual programmable control by the controller. In some embodiments, the steam recapture system 310 collects steam through programmable filtered air flow control that acts to transform steam to condensate that is then captured and gravity-fed into water tank 306 for reuse.

Figure 4A:
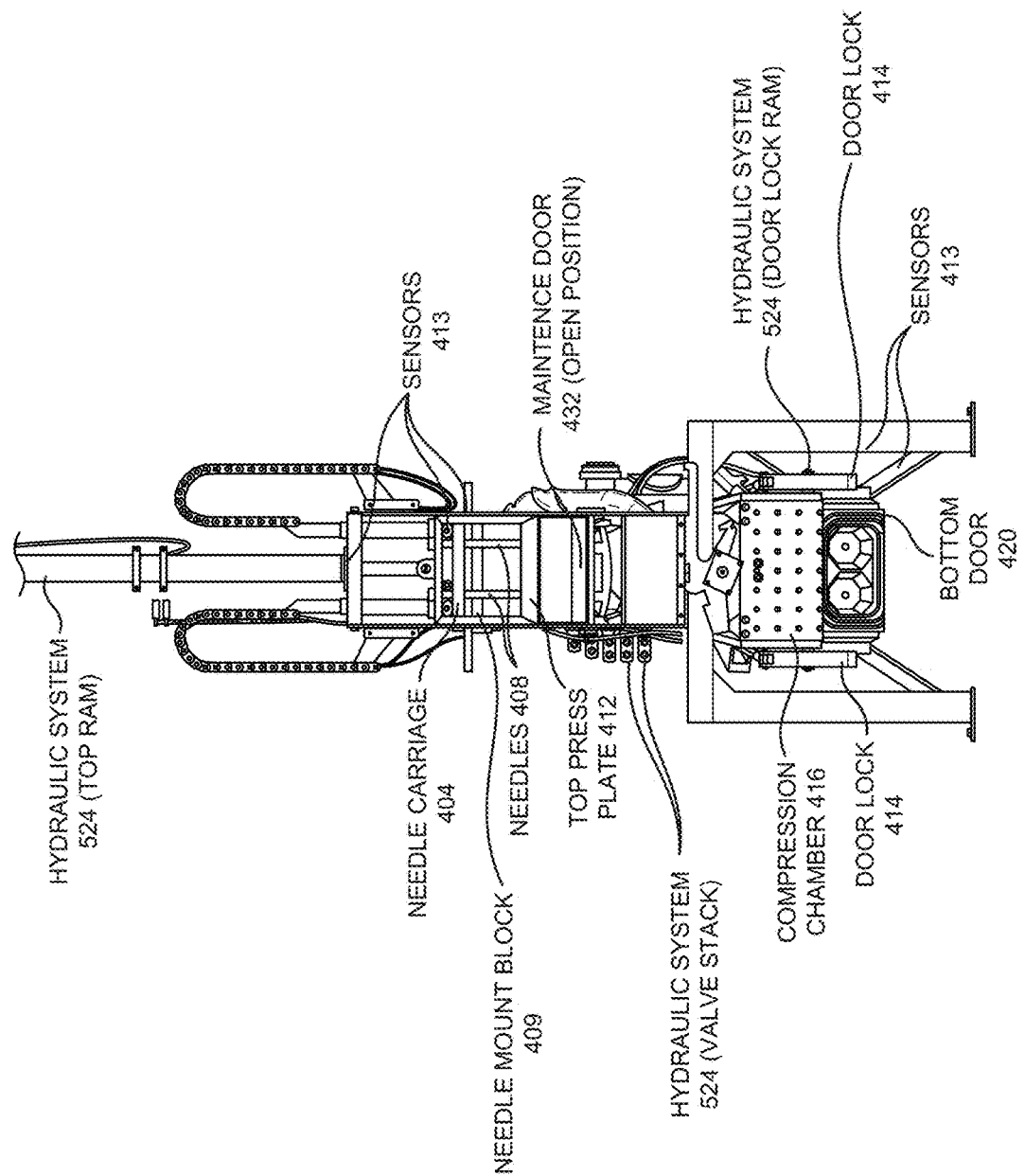
FIG. 4A is an illustrative front elevation view of a blocker cell of the apparatus of FIGS. 1-2, according to one or more embodiments.
Figure 4B:
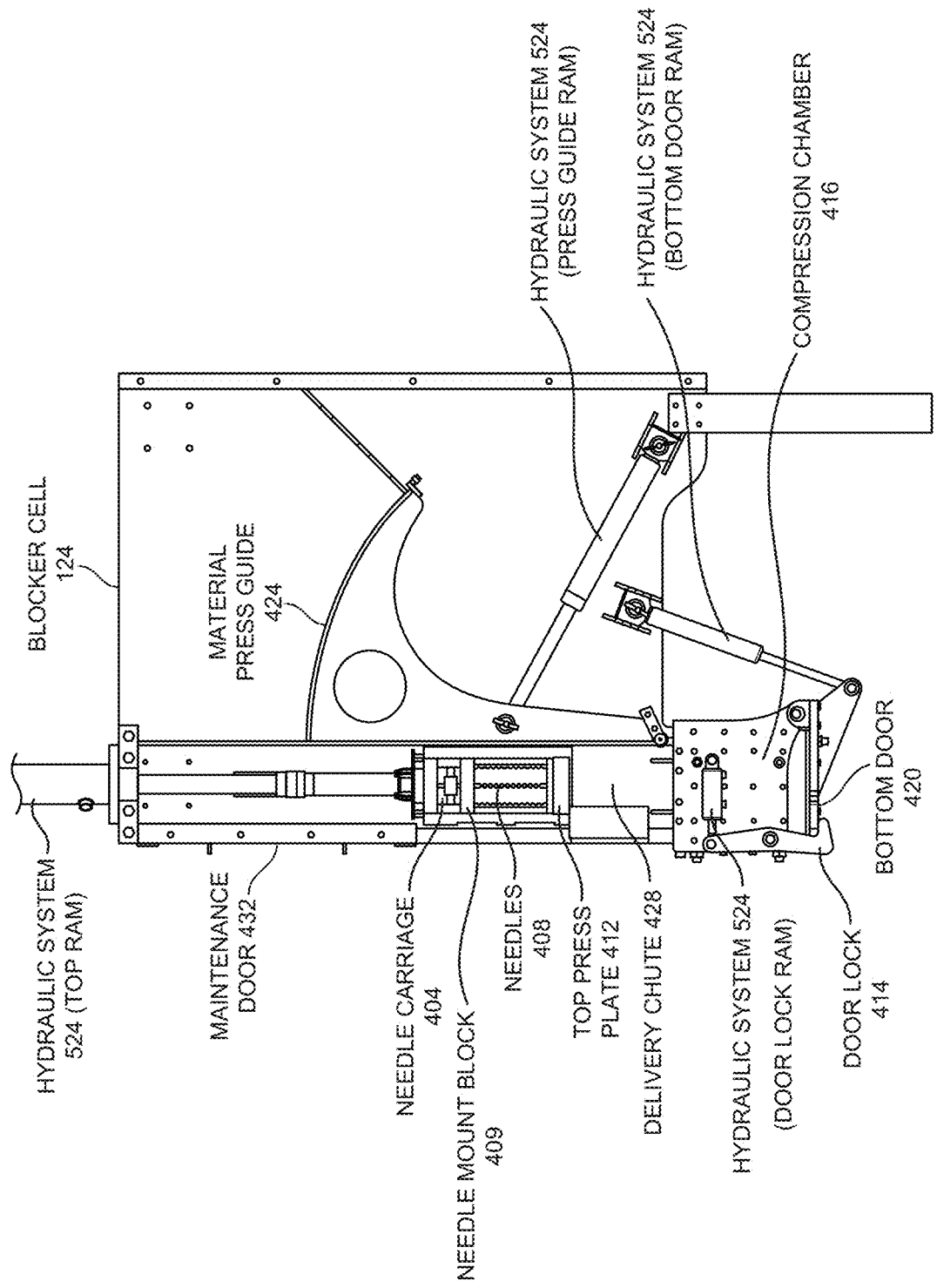
FIG. 4B is an illustrative side elevation view of the blocker cell of the apparatus of FIGS. 1-2, according to one or more embodiments.

FIG. 4A and FIG. 4B illustrate blocker cell 124 including, in some embodiments, a hydraulic system 524. As shown in FIG. 4A, a needle carriage 404 is positioned within a delivery chute 428 and includes a needle cylinder mount plate (e.g., part of needle mount block 409) to provide a location of steam distribution to the top press plate 412 via a manifold system that directly correlates to the dimensions and density of the desired output of the block being produced. Needle mount block 409 may include attachment points for needles on top of the block and can range from 4 to 100 needles. Needle mount block 409 may be customizable to adjust as required by the compression chamber and the size of the desired block output. Vertical pressure may be applied via a top ram of the hydraulic system 524 to form a block of the compressed material. The needles 408 include a hollow core and are constructed to deliver consistent steam delivery and avoid sticking to the plastic under high pressure. Needles 408 may be in operable communication with the controller via sensors 413 monitoring operating conditions. Top press plate 412 may be constructed to conduct temperature quickly without compromising stability and without sticking to the plastic at high pressure.

The sensors 413 are positioned to monitor top press plate 412 and are in operable communication with a controller. A compression chamber 416 provides a chamber wherein the plastic is compressed at high pressure. Compression chamber 416 includes a number of panels (at least one hollow-core block and one cap per panel) to provide a shape to the blocks. The panels are hermetically sealed from water and air and can withstand high pressures experienced within the chamber. A bottom door 420 includes a hollow block and a cap plate. Bottom door 420 is hinged to allow bottom door 420 to open and shut to allow the block to drop from compression chamber 416 once the block is formed therein. The bottom door 420 is locked in place by auto-sensing door locks 414 that open and close, e.g., via a door lock ram that is part of the hydraulic system 524, while vertical pressure is being applied.

Sensors 413 are positioned on bottom door 420 and are in operable communication with the controller. A material press guide 424 (see FIG. 4B) is provided with a hinge and presses plastic material into delivery chute 428 via the press guide ram as part of the hydraulic system 524 for compression within compression chamber 416. In the closed position, material press guide 424 forms the back wall of delivery chute 428 (see FIG. 4B), which delivers the plastic to compression chamber 416. Sensors 413 may be positioned within delivery chute 428 and in operable communication with the controller. A maintenance door 432 provides an access for maintenance of blocker cell 124. Maintenance door 432 (see FIG. 4B) forms the front wall of delivery chute 428.

In some embodiments, compression chamber 416 is detachable to permit the modification of blocker cell 124 to produce multiple articles with the same system. Here, the system may be provided with accessory components to produce the various articles.

Figure 5A:
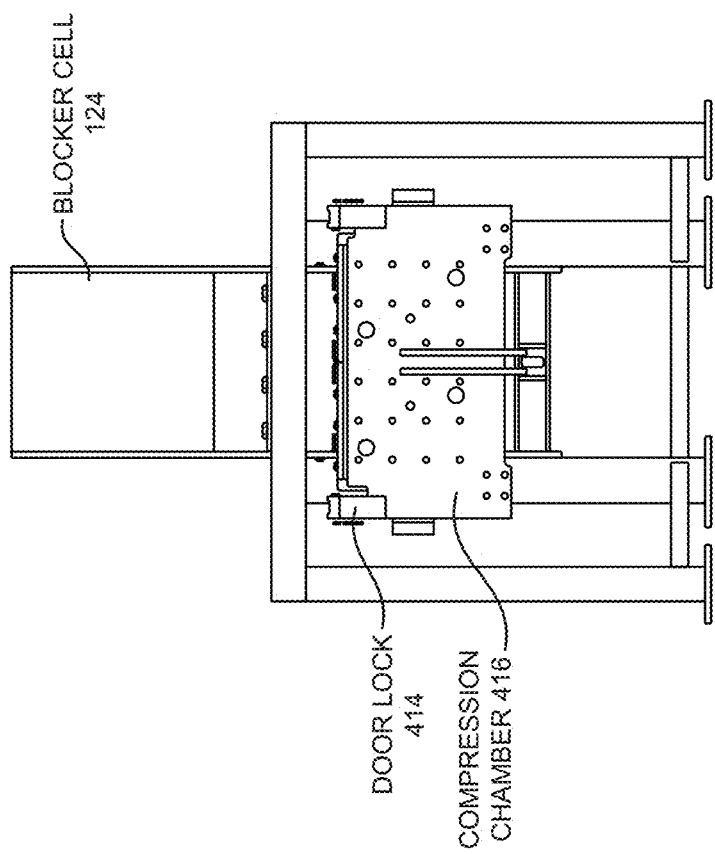
FIG. 5A is an illustrative view of the blocker cell of the apparatus of FIGS. 1-2 in a horizontal configuration, according to one or more embodiments.
Figure 5B:
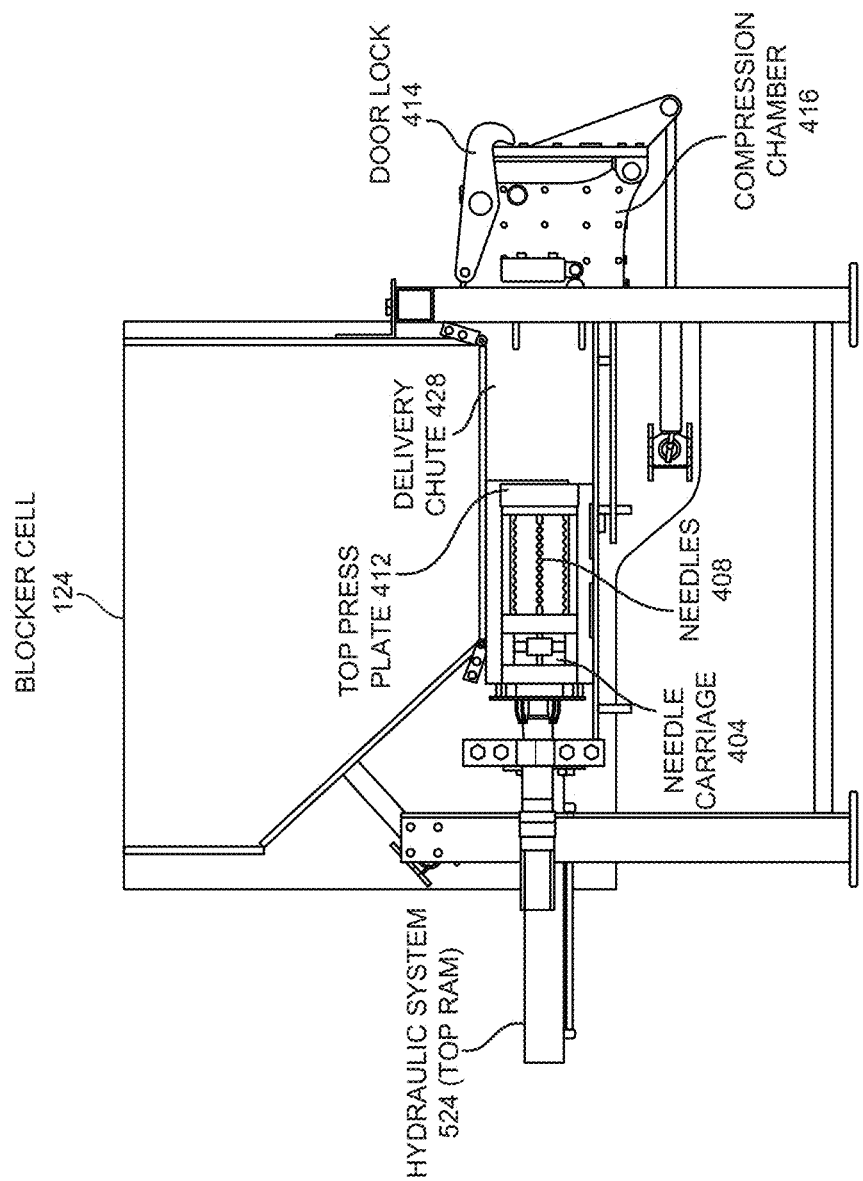
FIG. 5B is another illustrative view of the blocker cell of the apparatus of FIGS. 1-2 in the horizontal configuration, according to one or more embodiments.

As described herein above, a number of sensors (e.g., sensors 413) is positioned within blocker cell 124 and throughout the collective system to monitor the placement of material, position of moving parts, control factors, and safety factors. While blocker cell 124 is illustrated herein in a vertical configuration, blocker cell 124 may be installed horizontally with minor component adjustments as illustrated in FIG. 5A and FIG. 5B.

Figure 6:
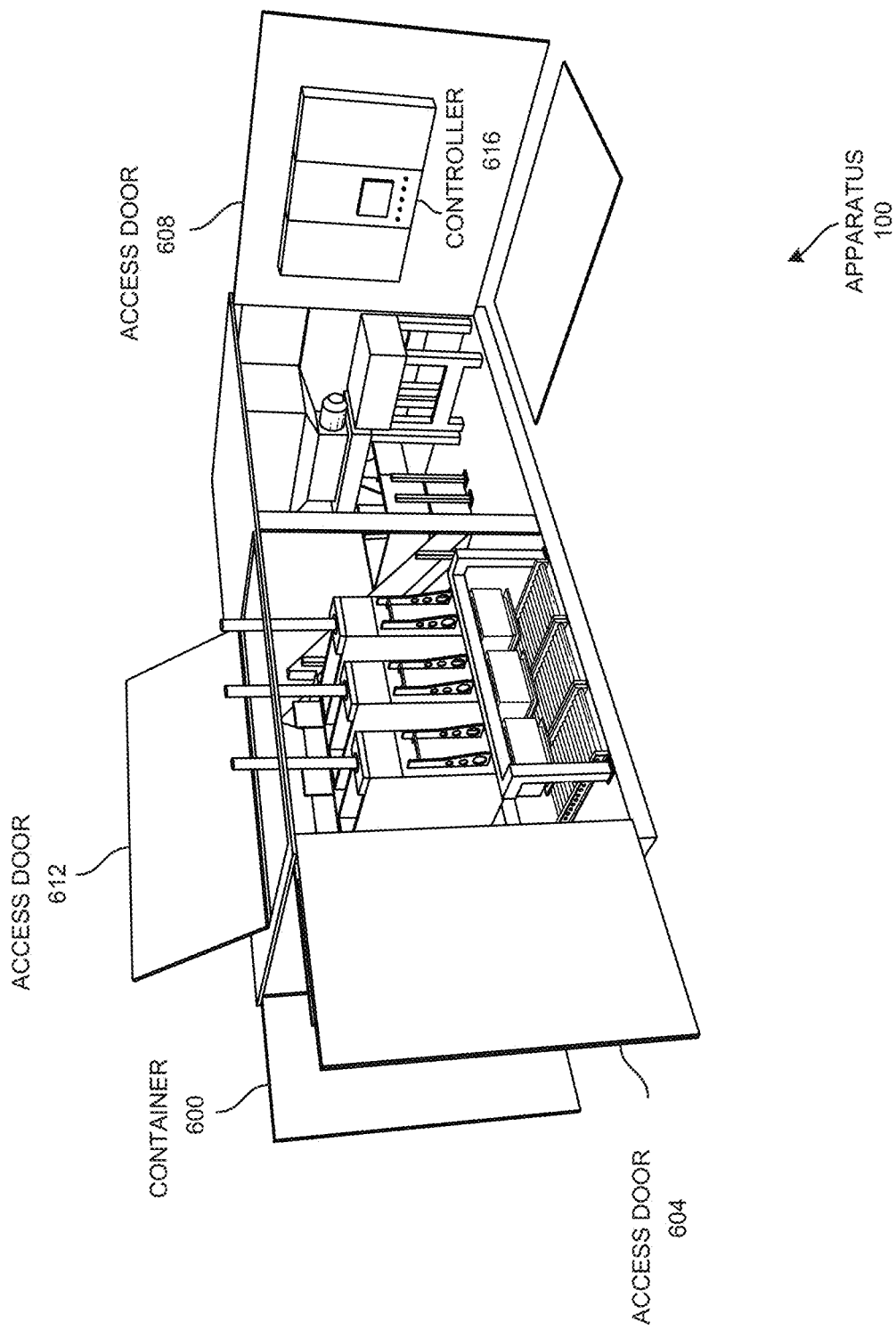
FIG. 6 is an illustrative perspective view of the apparatus of FIG. 1 in containerized form, according to one or more embodiments.
Figure 7:
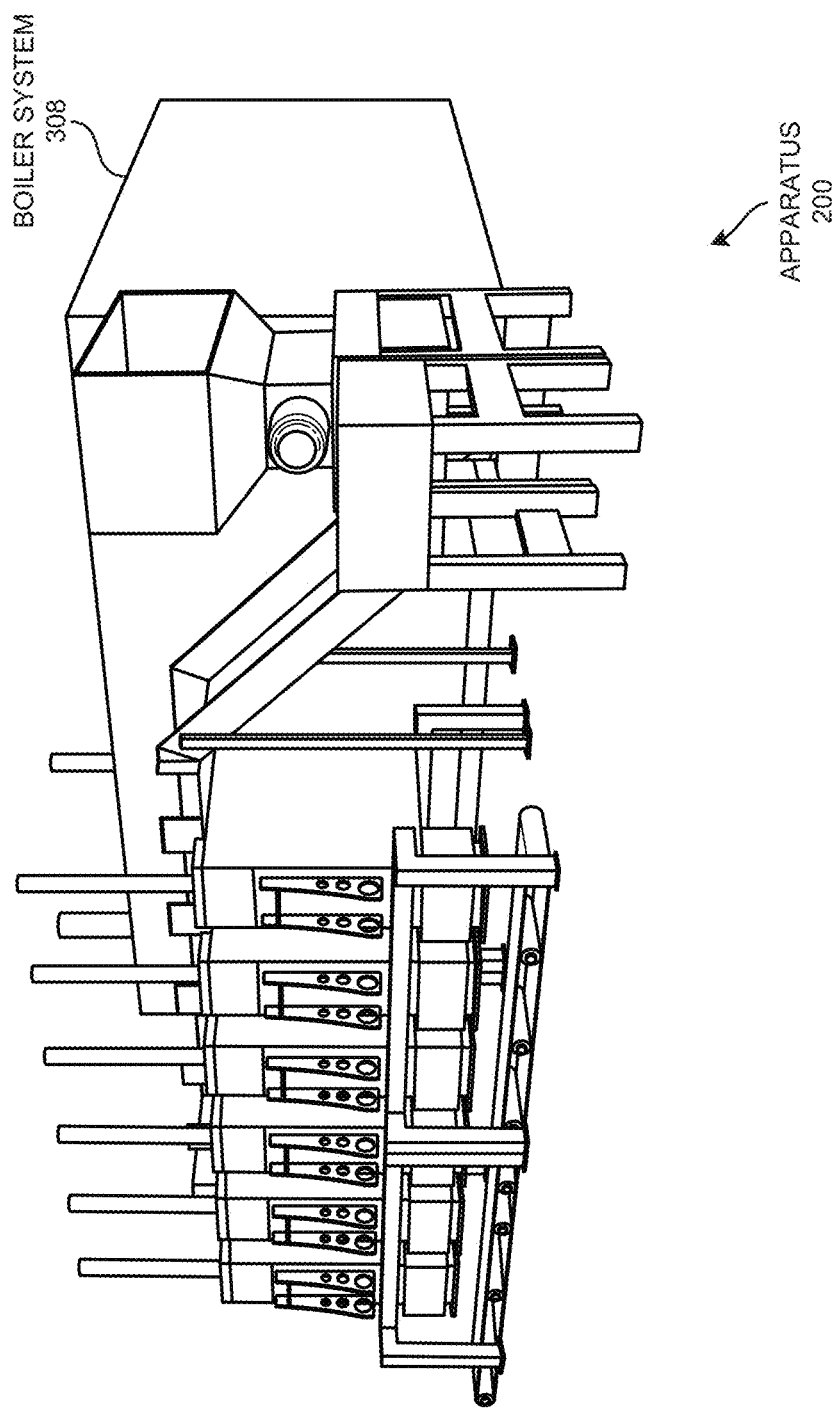
FIG. 7 is an illustrative side elevation view of a six blocker cell apparatus larger in scale compared to the three blocker cell apparatus of FIG. 1, according to one or more embodiments.

FIG. 6 and FIG. 7 illustrate perspective views of apparatus 100/200 provided within a container 600 and associated with boiler system 308. As described herein above, apparatus 100 may be contained within one or more standard ISO shipping containers and various sizes thereof. Here, apparatus 100 may be transferred via railway, vehicle or ship and/or combinations thereof to the location of use. This allows apparatus 100/200 to be readily deployed in various settings. A number of access doors 604, 608, 612 are provided to allow the system to be accessible and operational when positioned in the operating location. For example, access door 604 may be positioned to permit access to blocker cells 124. Access door 608 may open to permit access to controller 616 (the controller discussed above) and control interface.

FIG. 7 illustrates apparatus 200 that may include boiler system 308 separate from, but in communication with, the blocker cells, intake hopper, intake conveyor, and likewise components of the apparatus. In some embodiments, the system is modular to account for water and energy availability in the region within which it is deployed.

In some embodiments, the system may be provided in two or more configurations including a small configuration and a large configuration. The small configuration is designed for small recycling operations, small community projects, disaster relief and clean-up, and to allow for the system to be mobile and deployable in various environments. For example, the small configuration of the system may be packaged in two ISO standard shipping containers (20 ft to 40 ft in length) to facilitate easy transport and safety, wherein the first of the two shipping containers includes the operational components described herein and the second shipping container houses the boiler system. The large configurations are intended to be floor mounted in a desired position and are not mobile. The large configuration is modular and scalable to accept larger output requirements.

In some embodiments, the apparatus includes a robotic palletizer to aggregate and organize the blocks onto a pallet. In some embodiments, the apparatus includes a drying rack constructed of a wire mesh to allow drying of the blocks once they are formed.

Exemplary embodiments discussed herein, as indicated above, may focus on non-recyclable wastes in general. While the scope of non-recyclable wastes may extend to anything that the recycling industry cannot use, exemplary embodiments discussed herein may preferentially be directed to, specifically, non-recyclable plastic waste as raw material (e.g., non-recyclable plastic 802). As discussed above, typically, type 1 (code 1 above; e.g., PET) and type 2 (code 2; e.g., HDPE) plastics may be the only plastic types used by the recycling industry. The aforementioned types may be reconstituted into flakes to be used for recycling purposes. Exemplary embodiments may involve the use of type/code 3 to type/code 7 plastic waste material discussed above that are vastly different in chemical composition and intended use thereof to derive a usable product therefrom.

In addition thereto, exemplary embodiments may involve processing of multi-layer packaging material(s) such as the material(s) used in items including but not limited to chips bags, candy bags and coffee bean bags. For example, the aforementioned materials may have more than seven layers of different types of material(s) including but not limited to plastic, paper and aluminum that are put together. Typically, the aforementioned material(s) (e.g., including plastic waste material bearing recycling Code 1-Code 2) may also be unwanted by the recycling industry. Such unwanted/rejected plastic waste material bearing recycling Code 1-Code 2 may also be classified as non-recyclable plastic (e.g., non-recyclable plastic 802). In addition, exemplary embodiments may involve the processing of non-recyclable material (e.g., salt-water based Ultraviolet (UV) broken down material with particles growing thereon) out of the ocean.

Figure 8:
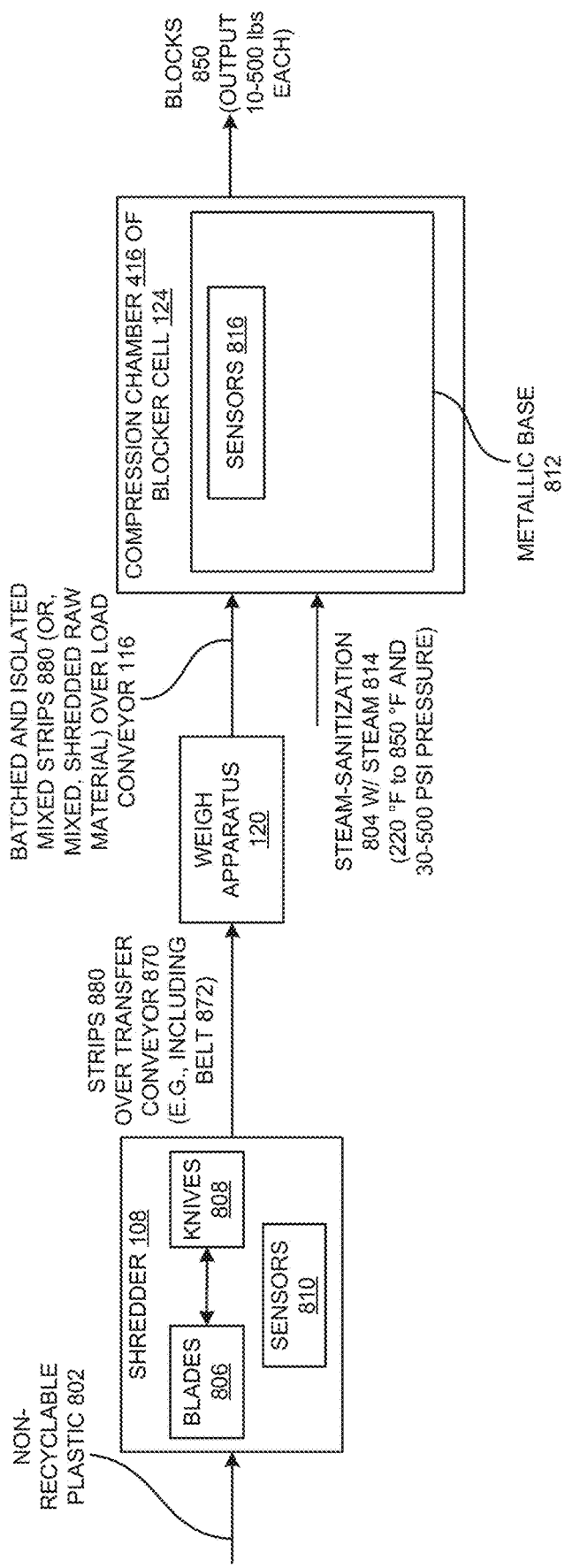
FIG. 8 is a schematic view of processing a non-recyclable raw material to form blocks of material through the apparatus of FIGS. 1-2, according to one or more embodiments.

FIG. 8 shows processing a raw material (e.g., non-recyclable plastic 802 or a recycling Code/Type 3 to Code/Type 7 plastic) to form the blocks (e.g., blocks 850) of material discussed above through apparatus 100, according to one or more embodiments. In one or more embodiments, the raw material (e.g., non-recyclable plastic 802) may be converted/shredded (e.g., through shredder 108) into strips of 0.120 inches to 1 inch in width regardless of the density thereof. For example, the raw material may be pieces of film packaging, bubble wrap envelopes and/or candy wrappers, but regardless of the raw material, shredder 108 may shred the raw material fed thereinto into strips of uniform width 0.120 inches to 1 inch.

In one or more embodiments, once the shredded raw material is conveyed through another conveyor mechanism (e.g., transfer conveyor 870) to weigh apparatus 120 and weighed through weigh apparatus 120 as discussed above, the weighed, shredded raw material may be fed into load conveyor 116 on the way to a compression chamber (e.g., compression chamber 416) of a blocker cell 124. In one or more embodiments, the movement of the raw material through the various conveyor mechanisms discussed herein may entangle the material into one another to achieve adequate mixing. In one or more embodiments, steam-sanitization 804 and application of pressure at compression chamber 416 may help act as a binder to bind the entangled material that becomes viscous such that the polymers within the raw material adhere to one another.

In one or more embodiments, shredder 108 may include a configuration of blades 806 (e.g., carbon steel blades) and/or knives 808 to shred the raw material into strips having a uniform dimensional width of 0.120 inches to 1 inch. In some implementations, a human or a robot may inspect the raw material before feeding thereof into shredder 108 for determination of conformance to predefined standards. Alternately or additionally, in some implementations, shredder 108 may have a set of sensors (e.g., one or more of sensors 810; e.g., material sensors, dimension sensors) and/or other operational mechanisms that determines the aforementioned conformance. In one or more embodiments, the raw material may have to conform to a dimensional height of 0.0393 inches to 2 inches and a dimensional length of 1 inch to 20 feet; the raw material may be monitored manually, through a robot, sensors 810 and/or through other operational mechanisms for conformance thereto. In one or more embodiments, shredder 108 may shred the aforementioned raw material into strips having a uniform dimensional width of 0.120 inches to 1 inch.

In one or more embodiments, shredder 108 may process up to 1 ton of the raw material per hour. In one example implementation, shredder 108 may include a 20-50 HP motor and may be designed based on a hex shaft therein to reduce slipping. Knives 808 may be hardened three-tooth carbon 10-16 inches in diameter and ⅜-⅝ inches in width. The teeth of blades 806 may be staggered to maximize grabbing and material pull-through.

Figure 9:
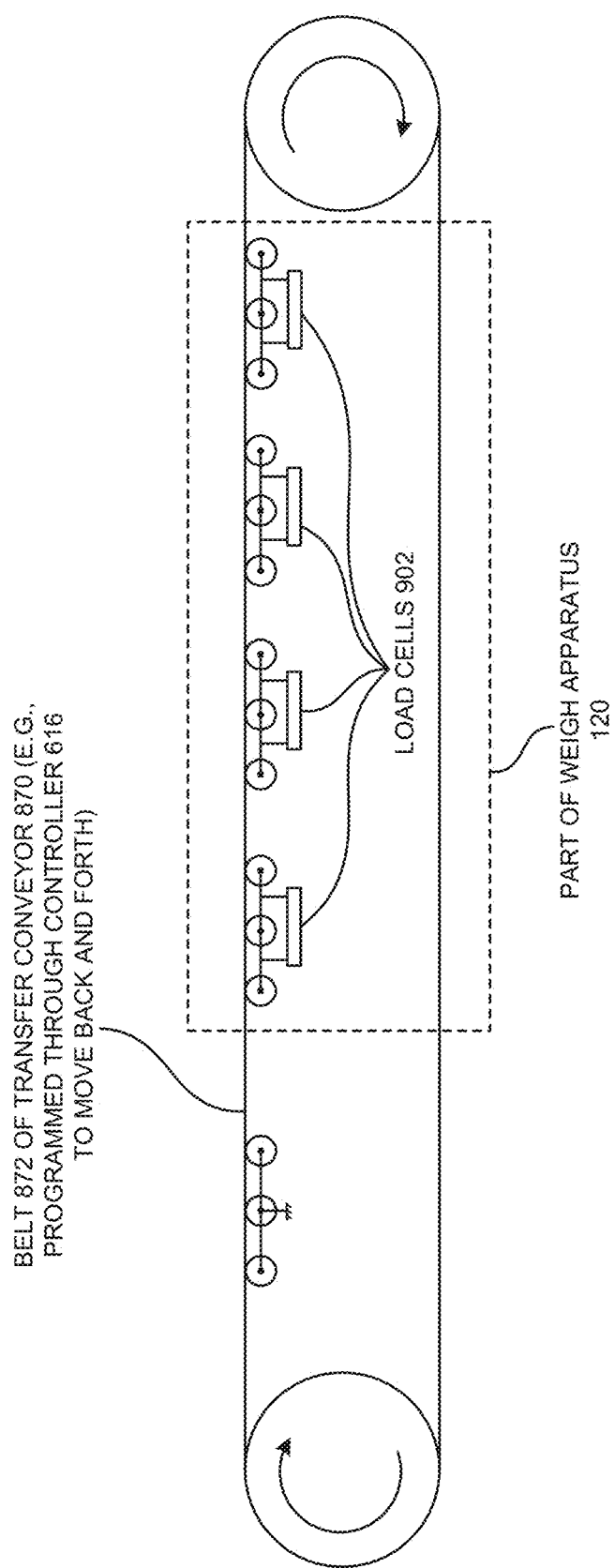
FIG. 9 is an illustrative view of a conveyor belt of a transfer conveyor of FIG. 8 and a weigh apparatus of FIG. 1 and FIG. 8 implemented with four load cells, according to one or more embodiments.

In one or more embodiments, the conveyor mechanisms discussed herein, for example, transfer conveyor 870 and/or other conveyors associated with weigh apparatus 120, may have a belt 872 (e.g., conveyor belt) therein that is programmed to move back and forth at certain/specific time intervals to mix the shredded raw material together. FIG. 9 shows belt 872 of transfer conveyor 870 being implemented with four example load cells 902 to ensure uniformity of distribution of the shredded raw material thereon. It should be noted that more or a lesser number of load cells 902 is within the scope of the exemplary embodiments discussed herein. In one or more embodiments, a portion of transfer conveyor 870 (or another conveyor) including load cells 902 distributed thereacross may form part of weigh apparatus 120.

In one or more embodiments, the programming of belt 872 to move back and forth at weigh apparatus 120 may agitate the mixed, shredded raw material that is then fed into a hopper (not shown) of load conveyor 116. In one or more embodiments, the shredded raw material may be mixed constantly through the natural movement of the conveyor mechanisms (e.g., transfer conveyor 870) discussed herein. In one or more embodiments, the compression of the mixed, shredded raw material may occur in compression chamber 416 to produce blocks 850.

In one or more embodiments, the agitation discussed above may be triggered once (or only once) ~50% of a desired weight of a final product (e.g., a block 850) is collected/weighed at weigh apparatus 120 in terms of the shredded raw material. In one or more embodiments, the programmed movement of belt 872 back and forth may occur in 3-30 second intervals until 100% of the desired weight of the final product is collected/weighed. In one example implementation, a standard weight of a block 850 may be 22 lbs, and agitation may start once 11 lbs of the shredded raw material are collected/weighed. So, belt 872 may then agitate at 3-30 second intervals until 22 lbs of the shredded raw material are collected/weighed. The weight of block 850 may be in a range from 10-500 lbs. All reasonable variations are within the scope of the exemplary embodiments discussed herein.

As discussed above, in one or more embodiments, the shredded raw material may be weighed before introduction into compression chamber 416/blocker cell 124. In one or more embodiments, shredder 108 may thus shred the raw material only until the shredded raw material collected and weighed is equal in weight to a desired weight (e.g., 10-500 lbs) of block 850. In one or more embodiments, the weighed, shredded, raw material may then be isolated and batched on load conveyor 116 before an exact aggregate density of the mixed, shredded raw material is delivered to compression chamber 416/blocker cell 124.

It should be noted that the base polymer may be common across Code/Type 1 to Code/Type 7 plastic waste materials. However, other chemicals and/or material(s) added to the base polymer to adapt a plastic waste material for use in a particular application may vary. In one or more embodiments, the uniformity in width of the shredded raw material (e.g., non-recyclable plastic 802) and the control of the conformance of the raw material fed into shredder 108 may provide not only for uniform mixing of the shredded raw material but also for activation of solely the base polymer (e.g., polyethylene) of the mixed, shredded raw material without activation of other chemicals therein during the compression process in blocker cells 124 as discussed herein.

In one or more embodiments, once the mixed, shredded raw material may be conveyed to blocker cell 124, which is a closed unit. In some implementations, the mixed, shredded raw material may be placed on a metallic base 812 (e.g., an aluminum or steel base) and steam 814 may be introduced to heat said metallic base 812 as part of steam-sanitization 804 discussed above. In one or more embodiments, as part of steam-sanitization 804, steam 814 may be controllably introduced (e.g., at a controllable/controlled temperature with other parameters such as duration of introduction/application also being controllable/controlled) such that a surface of the mixed, shredded raw material is cleaned and sanitized and the base polymer of the mixed, shredded raw material alone is activated and the other constituent materials (e.g., chemicals) thereof are not. In one or more embodiments, this may ensure that the base polymer alone becomes viscous without the base polymer melting while the other constituent materials are not chemically activated.

In one or more embodiments, the viscousness of the base polymer across the mixed, shredded raw material may enable the base polymer within the mixed, shredded raw material adhere, which, along with the compression within compression chamber 416, may enable each viscous base polymer of each previously shredded strip (e.g., shredded strips 880) of the raw material stick to another viscous base polymer of another previously shredded strip. without effecting a phase change in terms of melting or any other phase change of the base polymer of the raw material and without activating any other constituent material thereof.

As discussed above, in one or more embodiments, a steam-based compression process (other hydraulic/non-hydraulic compression processes may be within the scope of the exemplary embodiments discussed herein) within compression chamber 416/blocker cell 124 may compress the mixed, shredded raw material coming in batches as discussed above based on a volume of the mixed, shredded raw material. As an exact aggregate density of the shredded, raw material is delivered to compression chamber 416/blocker cell 124, in one or more embodiments, a volume of each batch of the mixed, shredded raw material delivered to compression chamber 416/blocker cell 124 may vary in one or more embodiments. In one or more embodiments, the steam-based compression may be programmed such that a height of block 850 coming out is fixed; this may imply that as much energy as required to reach a desired dimension of each block 850 may be used by the steam-based compression based on the programming.

All programming discussed herein may be performed by a device such as a computing device associated with apparatus 100 or controller 616. In one or more embodiments, the steam-based compression (e.g., pressure of steam 814) within compression chamber 416/blocker cell 124 may range from 30-500 Pounds per Square Inch (PSI) in terms of pressure. In one or more embodiments, the temperature of steam 814 may vary from 220° F. to 850° F. However, in one or more embodiments, steam 814 may simply be pulsated (e.g., introduced intermittently; e.g., from 10 seconds to two minutes in various areas of compression chamber 416; this also may be programmed through controller 616) inside compression chamber 416 instead of being introduced in a continuous manner to ensure that the base polymer discussed above alone is activated; the aforementioned temperature range of steam 814 may nevertheless be important from a perspective of steam-sanitization 804. While in one or more embodiments steam 814 may be at a hot temperature outside compression chamber 416, steam 814 may be pulsated and injected into compression chamber 416 where blocks 850 of adhered viscous plastic material (previously shredded and mixed) are being formed.

In one or more embodiments, compression chamber 416/blocker cell 124 may include a number of sensors 816 (e.g., proximity sensors to determine a distance between object boundaries, laser sensors to measure presence, absence and/or distance of an object from a point, heat sensors such as thermocouplers; sensors 413) to monitor parameters within compression chamber 416/blocker cell 124 and/or outside compression chamber 416/blocker cell 124. In one or more embodiments, blocks 850 may be basic units/building blocks in the construction industry. Other applications thereof are within the scope of the exemplary embodiments discussed herein. In one or more embodiments, blocks 850 may be used in conjunction with cement blocks and may be manufactured based on various form factors.

Figure 10:
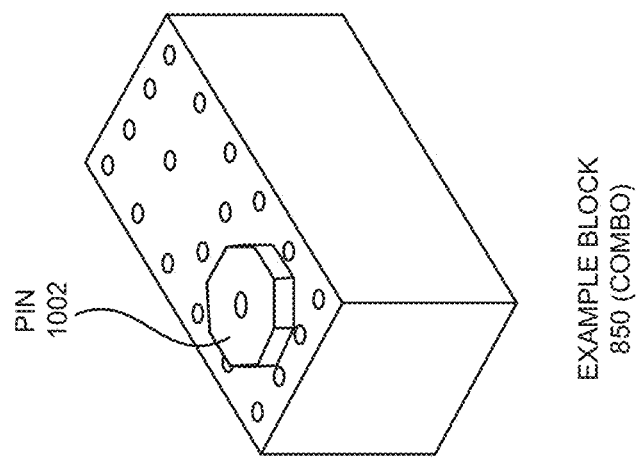
FIG. 10 is a schematic and illustrative view of example blocks utilizable for building construction.
Figure 10:
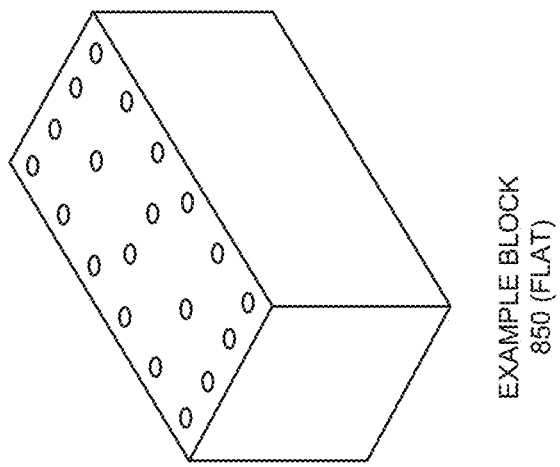
Figure 10:
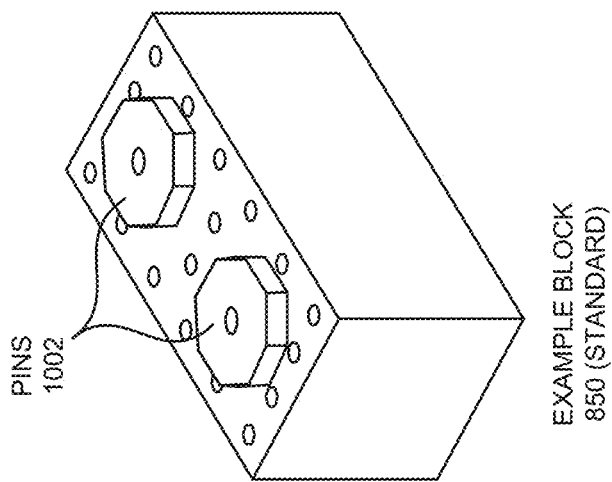

FIG. 10 shows example blocks 850 utilizable for building construction. As seen above, blocks 850 may be made entirely of non-recyclable plastic 802. FIG. 10 shows a standard block 850 that may include pins 1002 on a top thereof to provide stability and additional shear strength, for example, in wall assemblies. FIG. 10 also shows a flat block 850 that may have a flat top surface and may be intended for use in wall penetrations and as a top course of a wall assembly. Further, FIG. 10 shows a combination/combo block 850 that may include only one pin 1002 compared to standard block 850. As shown in FIG. 10, example blocks 850 may include channels (e.g., threaded, unthreaded) integrated therewithin as part of post-processing; elements such as pins 1002 may pass through said channels.

In one or more embodiments, blocks 850 may be integrated with structural building materials such as wood/lumber, steel and concrete. Further, in one or more embodiments, blocks 850 may serve as insulating structural components along with standard building materials. In one or more embodiments, blocks 850 may not crack and/or crumble, may be water-resistant and may not be consumable by termites and/or carpenter ants. Still further, in one or more embodiments, blocks 850 may be finished with readily available finishing material including but not limited to stucco, sheer rock/drywall, plaster, siding, paneling and specialized paints, and may meet sustainability requirements and/or goals. All reasonable variations are within the scope of the exemplary embodiments discussed herein.

Figure 11:
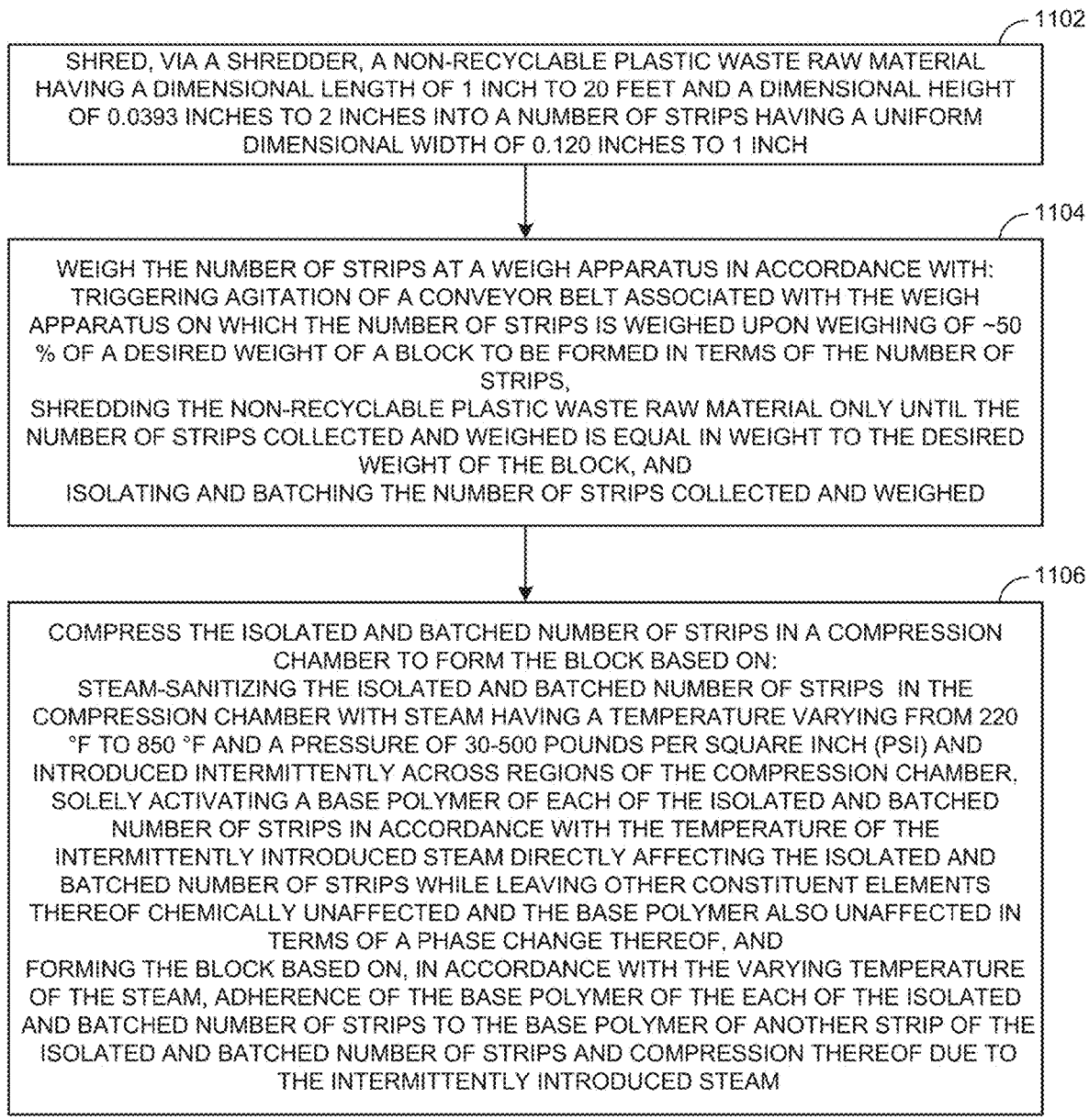
FIG. 11 is a process flow diagram detailing the operations involved in forming blocks having dimensional uniformity thereacross associated with building construction using non-recyclable plastic waste raw material, according to one or more embodiments.

FIG. 11 shows a process flow diagram detailing the operations involved in forming blocks (e.g., blocks 850) having dimensional uniformity thereacross associated with building construction using non-recyclable plastic waste raw material (e.g., non-recyclable plastic 802 such as plastic waste material bearing recycling Code 3-Code 7 and/or plastic waste (e.g., rejected) material bearing recycling Code 1-Code 2), according to one or more embodiments. In one or more embodiments, operation 1102 may involve shredding, via a shredder (e.g., shredder 108), the non-recyclable plastic waste raw material having a dimensional length of 1 inch to 20 feet and a dimensional height of 0.0393 inches to 2 inches into a number of strips (e.g., strips 880) having a uniform dimensional width of 0.120 inches to 1 inch. In one or more embodiments, operation 1104 may involve weighing the number of strips at a weigh apparatus (e.g., weigh apparatus 120) in accordance with triggering agitation (e.g., based on programming through controller 616) of a conveyor belt (e.g., belt 872) associated with the weigh apparatus on which the number of strips is weighed upon weighing of ~50% of a desired weight of a block of the blocks to be formed in terms of the number of strips, shredding the non-recyclable plastic waste raw material only until the number of strips collected and weighed is equal in weight to the desired weight of the block, and isolating and batching the number of strips collected and weighed.

In one or more embodiments, operation 1106 may then involve compressing the isolated and batched number of strips in a compression chamber (e.g., compression chamber 416) to form the block based on steam-sanitizing (e.g., stream-sanitization 804) the isolated and batched number of strips in the compression chamber with steam (e.g., steam 814) having a temperature varying from 220° F. to 850° F. and a pressure of 30-500 PSI and introduced intermittently across regions of the compression chamber, and solely activating a base polymer (e.g., polyethylene) of each of the isolated and batched number of strips in accordance with the temperature of the intermittently introduced steam directly affecting the isolated and batched number of strips while leaving other constituent elements thereof chemically unaffected and the base polymer also unaffected in terms of a phase change thereof.

In one or more embodiments, operation 1106 may also involve compressing the batched number of strips in the compression chamber to form the block based on, in accordance with the varying temperature of the steam, adherence of the base polymer of the each of the isolated and batched number of strips to the base polymer of another strip of the isolated and batched number of strips and compression thereof due to the intermittently introduced steam.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of forming blocks having dimensional uniformity thereacross associated with building construction, comprising:

shredding, via a shredder, a plastic waste raw material having a dimensional length of 1 inch to 20 feet and a dimensional height of 0.0393 inches to 2 inches into a plurality of strips having a uniform dimensional width of 0.120 inches to 1 inch;

weighing the plurality of strips at a weigh apparatus in accordance with:
  triggering agitation of a conveyor belt associated with the weigh apparatus on which the plurality of strips is weighed upon weighing of ~50% of a desired weight of a block of the blocks to be formed in terms of the plurality of strips;
  continuing the shredding of the plastic waste raw material only until the plurality of strips collected and weighed is equal in weight to the desired weight of the block; and
  isolating and batching the plurality of strips collected and weighed; and compressing the isolated and batched plurality of strips in a compression chamber to form the block based on:
  steam-sanitizing the isolated and batched plurality of strips in the compression chamber with steam having a temperature varying from 220° F. to 850° F. and a pressure of 30-500 Pounds per Square Inch (PSI) and introduced intermittently across regions of the compression chamber;
  solely activating a base polymer of each of the isolated and batched plurality of strips in accordance with the temperature of the intermittently introduced steam directly affecting the isolated and batched plurality of strips while leaving other constituent elements thereof chemically unaffected and the base polymer also unaffected in terms of a phase change thereof; and
  forming the block based on, in accordance with the varying temperature of the steam, adherence of the base polymer of the each of the isolated and batched plurality of strips to the base polymer of another strip of the isolated and batched plurality of strips and compression thereof due to the intermittently introduced steam.

2. The method of claim 1, further comprising additionally mixing at least one of: the plurality of strips and the isolated and batched plurality of strips into entanglement therebetween based on movement thereof correspondingly at least one of: from the shredder to the weigh apparatus and from the weigh apparatus to the compression chamber.

3. The method of claim 1, wherein the triggering agitation of the conveyor belt associated with the weigh apparatus based on programming thereof through a controller to move back and forth in 3-30 second time intervals.

4. The method of claim 1, further comprising implementing the conveyor belt associated with the weigh apparatus with a plurality of load cells to ensure uniformity of distribution of the plurality of strips thereon.

5. The method of claim 1, further comprising the weight of the block formed being between 10-500 lbs.

6. The method of claim 1, further comprising delivering an exact aggregate density of the isolated and batched plurality of strips to the compression chamber for the compression therein.

7. The method of claim 1, comprising the plastic waste raw material being at least one of: plastic waste material bearing recycling at least one of Code 3, Code 4, Code 5, Code 6 and Code 7 and plastic waste material bearing recycling at least one of Code 1 and Code 2.

8. The method of claim 1, comprising processing up to 1 ton of the plastic waste raw material at the shredder per hour of time.

9. A method of forming blocks having dimensional uniformity thereacross associated with building construction, comprising:
  feeding, into a shredder, at least one of: plastic waste material bearing recycling Code 3, Code 4, Code 5, Code 6 and Code 7 and plastic waste material bearing recycling Code 1and Code 2 having a dimensional length of 1 inch to 20 feet and a dimensional height of 0.0393 inches to 2 inches;
  shredding, via the shredder, the at least one of: the plastic waste material bearing recycling Code 3, Code 4, Code 5, Code 6 and Code 7 and the plastic waste material bearing recycling Code 1 and Code 2 into a plurality of strips having a uniform dimensional width of 0.120 inches to 1 inch;
  weighing the plurality of strips at a weigh apparatus in accordance with:
    triggering agitation of a conveyor belt associated with the weigh apparatus on which the plurality of strips is weighed upon weighing of ~50% of a desired weight of a block of the blocks to be formed in terms of the plurality of strips;
    the shredding of the at least one of: the plastic waste material bearing recycling Code 3, Code 4, Code 5, Code 6 and Code 7 and the plastic waste material bearing recycling Code 1 and Code 2 only until the plurality of strips collected and weighed is equal in weight to the desired weight of the block; and
    isolating and batching the plurality of strips collected and weighed; and
  compressing the isolated and batched plurality of strips in a compression chamber to form the block based on:
    steam-sanitizing the isolated and batched plurality of strips in the compression chamber with steam having a temperature varying from 220° F. to 850° F. and a pressure of 30-500 PSI and introduced intermittently across regions of the compression chamber;
    solely activating a base polymer of each of the isolated and batched plurality of strips in accordance with the temperature of the intermittently introduced steam directly affecting the isolated and batched plurality of strips while leaving other constituent elements thereof chemically unaffected and the base polymer also unaffected in terms of a phase change thereof; and
    forming the block based on, in accordance with the varying temperature of the steam, adherence of the base polymer of the each of the isolated and batched plurality of strips to the base polymer of another strip of the isolated and batched plurality of strips and compression thereof due to the intermittently introduced steam.

10. The method of claim 9, further comprising additionally mixing at least one of the plurality of strips and the isolated and batched plurality of strips into entanglement therebetween based on movement thereof correspondingly at least one of: from the shredder to the weigh apparatus and from the weigh apparatus to the compression chamber.

11. The method of claim 9, wherein triggering agitation of the conveyor belt associated with the weigh apparatus based on programming thereof through a controller to move back and forth in 3-30 second time intervals.

12. The method of claim 9, further comprising implementing the conveyor belt associated with the weigh apparatus with a plurality of load cells to ensure uniformity of distribution of the plurality of strips thereon.

13. The method of claim 9, further comprising the weight of the block formed being between 10-500 lbs.

14. The method of claim 9, further comprising delivering an exact aggregate density of the isolated and batched plurality of strips to the compression chamber for the compression therein.

15. The method of claim 9, comprising processing up to 1 ton of the at least one of plastic waste material bearing recycling Code 3, Code 4, Code 5, Code 6 and Code 7 and the plastic waste material bearing recycling Code 1 and Code 2 at the shredder per hour of time.

16. A method of forming blocks having dimensional uniformity thereacross associated with building construction, comprising:
    shredding, via a shredder, a plastic waste raw material having a dimensional length of 1 inch to 20 feet and a dimensional height of 0.0393 inches to 2 inches into a plurality of strips having a uniform dimensional width of 0.120 inches to 1 inch;
    weighing the plurality of strips at a weigh apparatus in accordance with:
        triggering agitation of a conveyor belt associated with the weigh apparatus on which the plurality of strips is weighed upon weighing of ~50% of a desired weight of 10-500 lbs of a block of the blocks to be formed in terms of the plurality of strips;
        continuing the shredding of the plastic waste raw material only until the plurality of strips collected and weighed is equal in weight to the desired weight of 10-500 lbs of the block; and
        isolating and batching the plurality of strips collected and weighed;
    delivering an exact aggregate density of the isolated and batched plurality of strips to a compression chamber; and
    compressing the isolated and batched plurality of strips in the compression chamber to form the block based on:
        steam-sanitizing the isolated and batched plurality of strips in the compression chamber with steam having a temperature varying from 220° F. to 850° F. and a pressure of 30-500 PSI and introduced intermittently across regions of the compression chamber;
        solely activating a base polymer of each of the isolated and batched plurality of strips in accordance with the temperature of the intermittently introduced steam directly affecting the isolated and batched plurality of strips while leaving other constituent elements thereof chemically unaffected and the base polymer also unaffected in terms of a phase change thereof; and
        forming the block based on, in accordance with the varying temperature of the steam, adherence of the base polymer of the each of the isolated and batched plurality of strips to the base polymer of another strip of the isolated and batched plurality of strips and compression thereof due to the intermittently introduced steam.

17. The method of claim 16, further comprising additionally mixing at least one of: the plurality of strips and the isolated and batched plurality of strips into entanglement therebetween based on movement thereof correspondingly at least one off from the shredder to the weigh apparatus and from the weigh apparatus to the compression chamber.

18. The method of claim 16, wherein triggering agitation of the conveyor belt associated with the weigh apparatus based on programming thereof through a controller to move back and forth in 3-30 second time intervals.

19. The method of claim 16, further comprising implementing the conveyor belt associated with the weigh apparatus with a plurality of load cells to ensure uniformity of distribution of the plurality of strips thereon.

20. The method of claim 16, comprising the plastic waste raw material being at least one of: plastic waste material bearing recycling Code 3, Code 4, Code 5, Code 6 and Code 7 and plastic waste material bearing recycling Code 1 and Code 2.

* * * * *